United States Patent [19]

Fine

[11] Patent Number: 4,792,535

[45] Date of Patent: Dec. 20, 1988

[54] UV-TRANSMITTING GLASSES

[75] Inventor: Gerald J. Fine, Corning, N.Y.

[73] Assignee: Corning Glass Works, Corning, N.Y.

[21] Appl. No.: 92,765

[22] Filed: Sep. 2, 1987

[51] Int. Cl.$^4$ ............... C03C 3/091; C03C 4/08; C03C 3/11

[52] U.S. Cl. ................................. 501/66; 501/56; 501/905

[58] Field of Search ............ 501/13, 66, 905, 56

[56] References Cited

U.S. PATENT DOCUMENTS

| | | | |
|---|---|---|---|
| 1,886,280 | 11/1932 | Locke et al. | 501/66 |
| 2,433,928 | 1/1948 | Sheldon | 501/66 |
| 3,671,380 | 6/1972 | Ali et al. | 501/66 |
| 3,994,708 | 11/1976 | von Reth et al. | 501/66 |
| 4,018,965 | 4/1977 | Kerko et al. | 501/13 |
| 4,396,720 | 8/1983 | Beall et al. | 501/66 |

FOREIGN PATENT DOCUMENTS 0151346  8/1985  European Pat. Off. ............ 501/66

*Primary Examiner*—Mark L. Bell
*Assistant Examiner*—Anthony Green
*Attorney, Agent, or Firm*—Kees van der Sterre

[57] ABSTRACT

Alkali boroaluminosilicate glasses exhibiting moderately high thermal expansion coefficients, good melting characteristics, and a UV transmittance of at least 80% in 1 mm thickness at a wavelength of 254 nm are described, such glasses consisting essentially of about 58–62%, $SiO_2$, 15–18% $B_2O_3$, 11.5–14.5% $Al_2O_3$, 1–2.5% $Li_2O$, 5.5–6.5% $Na_2O$, 0–2% $K_2O$, and 0–0.6% Cl.

1 Claim, 1 Drawing Sheet

UV-TRANSMITTING GLASSES

BACKGROUND OF THE INVENTION

The present invention relates to silicate glass compositions capable of transmitting light in the ultraviolet portion of the spectrum, and more particularly to alkali boroaluminosilicate glasses exhibiting both good ultraviolet transparency and a thermal expansion coefficient sufficiently high to enable the glass to be sealed to substrates of relatively high expansion such as alumina.

Glasses exhibiting good transmittance in the near ultraviolet portion of the spectrum (e.g. at 254 nm), are of interest for a number of applications, including optical components for spectral analyzers and lamp envelopes for UV-emitting lamps. A number of glasses designed specifically for the transmission of ultraviolet light (180–400 nm) are commercially available. However, due to a variety of factors, silicate glasses with exceptionally good ultraviolet transmission tend to have relatively low coefficients of thermal expansion and are generally not easily melted. For example, Corning Code 9741 glass, which was originally intended for use in germicidal and ozone lamps but which has more recently been employed to provide windows for EPROM chips, has a minimum of 80% transmittance through a 1 mm thickness at 254 nm, but has a thermal expansion coefficient of $38 \times 10^{-7}/°C$.

The ultraviolet transmission characteristics of silicate glasses have been reviewed by G. H. Sigel, Jr., "Ultraviolet Spectra of Silicate Glasses: A Review of Some Experimental Evidence", *J. Non-crystalline Solids*, 13 (1973/74) 372–398. As noted by Sigel, pure fused silica exhibits excellent ultraviolet transmittance, having an absorption edge below 160 nm. However the addition to fused silica of modifying species, particularly including alkali metal oxides, shifts the absorption edge strongly toward the visible, with the extent of the shift depending upon the nature and concentration of modifying oxides included in the glass.

As also pointed out by Sigel, certain impurity irons exhibit strong ultraviolet absorption and must be excluded from the glass if high transparency in the ultraviolet is to be achieved. Transition metals such as iron and rare earth elements were identified as particularly effective UV absorbers.

Unfortunately, fused silica has a very low thermal expansion coefficient, rendering it unattractive as a candidate for sealing to materials such as metals or other ceramics. In addition, pure $SiO_2$ is not easily melted and formed at temperatures economically attainable in manufacture.

Alternatives to the use of silica or silicate glasses include the use of oxides such as $B_2O_3$ and $P_2O_5$ or glasses containing large amounts of these oxides, or even the use of non-oxide glasses such as $BeF_2$. The latter compound, however, is both hygroscopic and highly toxic, while glasses based on $P_2O_5$ and/or $B_2O_3$ tend to have poor chemical durability, especially against water attack. Phosphate and borate glasses also tend to have less favorable viscosity/liquidus characteristics, e.g., a lower viscosity at the glass liquidus temperature, and thus present melting and forming problems.

Published Japanese patent application JA No. 62-027346 describes a family of UV-transparent phosphate glasses for use as small window elements in erasable-programmable read-only memory (EPROM) microelectronic circuit devices. However, due to the substantial $P_2O_5$-content of these glasses (35–70% by weight), they would be expected to be less durable and harder to form than more conventional silicate glasses. Therefore, there remains a need for alternative silicate glass compositions exhibiting good ultraviolet transmittance, but with a higher thermal expansion coefficient and better melting and forming characteristics.

Alkali boroaluminosilicate glasses of the type presently sold for applications requiring high ultraviolet transmittance are described, for example, in U.S. Pat. No. 2,382,056. That patent discloses the effect of alumina ($Al_2O_3$) additions to selected alkali borosilicate glasses to achieve improved ultraviolet transparency. The disclosed glasses typically contain 50–70% $SiO_2$, 1–5% total of alkali metal oxides, 20–40% $B_2O_3$ and 4–10% $Al_2O_3$. They also contain substantial fluorine as an aid to melting. A preferred glass provided in accordance with the patent exhibits a transmittance in 1 mm thickness of about 5–10% at 185 nm and about 80% at 254 nm.

As suggested in the prior art, ultraviolet-transparent glasses fusible to alumina substrates would have specific utility in the manufacture of EPROM devices. These devices employ small windows of UV transparent glass sealed to the substrate, which glass should therefore match the thermal expansion of the substrate as closely as possible. Desirably, thermal expansion coefficients in the range of about $56-62 \times 10^{-7}/°C$. would be preferred for this application, but existing UV-transparent silicate glasses are much lower in expansion.

Additional difficulties with borosilicate glasses of the commercial type, which contain high quantities of added fluorine, include fluorine volatilization from the glass during melting. Fluorine volatilization is a major environmental concern in manufacture, and also promotes the formation of cord in the glass, degrading homogeneity and giving rise to local variations in refractive index and physical properties which are particularly undesirable in small samples.

The addition of alkali metal oxides to silicate glasses is one expedient which has in the past been resorted to in order to soften the glass and increase the thermal expansion coefficient thereof. However this alone is not a viable option to modify known ultraviolet-transmitting glasses since, as noted above, alkali metal additions tend to move the absorption edge of borosilicate glasses toward the visible region of the spectrum.

Alkali boroaluminosilicate glasses exhibiting higher expansion coefficients and good optical quality have been developed for other applications not requiring good UV transmittance. For example, U.S. Pat. No. 4,130,437 discloses a family of alkali boroaluminosilicate glasses comprising lead oxide and silver halides which have good glass forming characteristics and can be melted to optical quality. However, these glasses are photochromic and have been employed mainly for ophthalmic and related applications; they do not exhibit good UV transparency.

Accordingly, it is a principal object of the present invention to provide novel glass compositions providing glasses with high ultraviolet transmittance and higher expansion coefficients than prior art UV-transmitting glasses, making them compatible with higher expansion substrates such as alumina.

It is a further object of the invention to provide glass compositions for UV-transmitting glasses which exhibit good optical quality and are substantially free of cord and other melting defects.

It is a further object of the invention to provide UV-transmitting glasses which exhibit good melting and forming characteristics so that they can be readily formed into high quality glass products such as cane.

Other objects and advantages of the invention will become apparent from the following description thereof.

SUMMARY OF THE INVENTION

The present invention provides silicate glasses which exhibit ultraviolet transparency substantially equivalent to that of prior art UV-transmitting silicate glasses in the wavelength range of primary interest while offering more moderate thermal expansion characteristics than the prior art glasses. Further, the glasses of the invention retain moderate softening temperatures convenient for bonding or heat sealing the glass to substrates such as alumina, and also excellent melting and forming characteristics.

Glasses provided in accordance with the invention consist essentially, in weight percent, of about 58–62% $SiO_2$, 15–18% $B_2O_3$, 11.5–14.5% $Al_2O_3$, 5.5–6.5% $Na_2O$, 1–2.5% $Li_2O$, 0–2% $K_2O$, and 0–0.6% Cl. They are generally substantially free of impurities such as iron and titanium, and are also substantially free of added fluorine. Thus they can be readily melted without objectionable volatilization of batch constituents to provide glass of high quality. Moreover, they have adequate viscosity at the liquidus (at least about $10^5$ poises) such that they can be conveniently formed into cane or other useful shapes by conventional forming techniques.

Glasses provided in accordance with the invention are characterized by ultraviolet transparencies such that they transmit at least 80% of incident UV light in 1 mm thickness at 254 nm. Further, they exhibit thermal expansion coefficients in the range of about $56-62 \times 10^{-7}/°C$., and offer softening temperatures equivalent to or below those of prior art UV transmitting silicate glasses.

DESCRIPTION OF DRAWING

The invention may be further understood by reference to the drawing, wherein.

DETAILED DESCRIPTION

Figure 1:
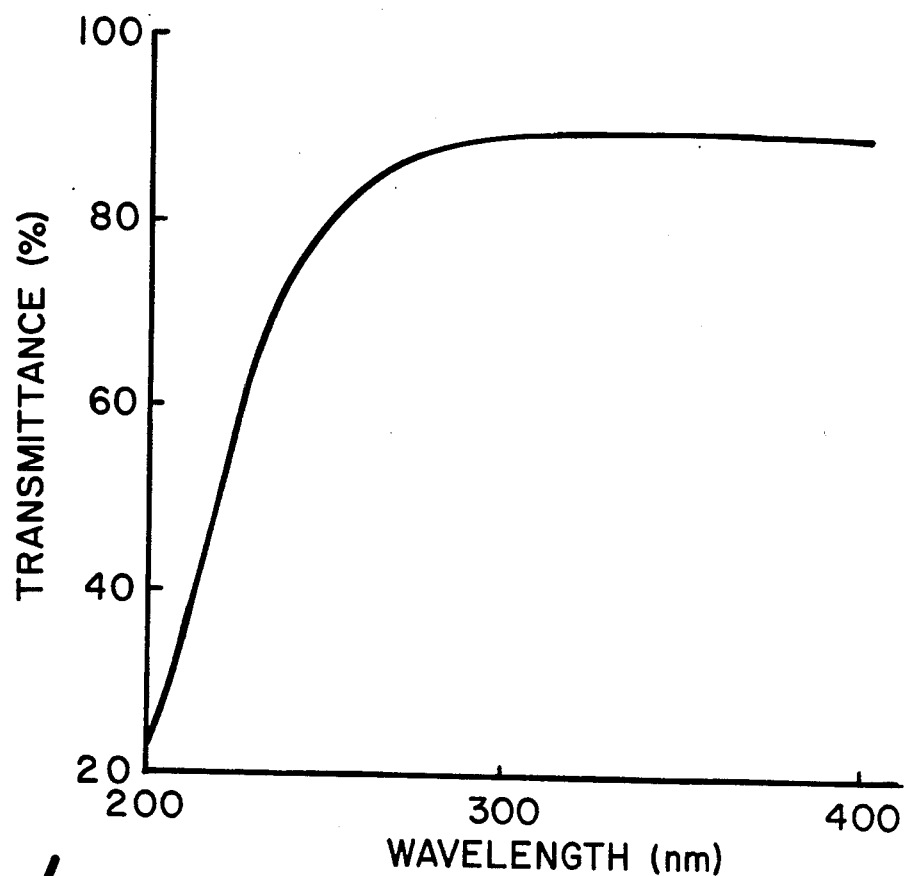
FIG. 1 is a graph plotting light transmission as a function of wavelength for a glass provided in accordance with the invention.

As previously noted, a particularly demanding application for UV-transmitting glasses such as herein described is the use of the glass to provide ultraviolet transmitting windows for application to EPROM circuit chips. For this application, it is desired to have glasses with thermal expansion coefficients (0°–300° C.) in the range of about $56-62 \times 10^{-7}/°C$. The ultraviolet transmittance of the glass at 254 nm should be at least 80% through 1 mm thickness, and a glass softening point in the range of 675°–705° C. is desirable. Finally, the glass should be readily formable as sheet or cane without the appearance of cord or seed defects of any kind.

The two factors primarily governing the ultraviolet transmittance of these glasses are the level of impurities in the glass and the concentrations of modifiers used to control properties. With respect to the first factor, it is important to exclude as much as possible from the glass constituents such as iron and titania which cause strong ultraviolet absorption. This is effected by utilizing only pure batch materials in the production of the glasses.

Examples of batch materials which can be used to produce glasses in accordance with the invention are pure sand, boric oxide, aluminum hydroxide or more preferably calcined alumina, lithium carbonate, sodium carbonate, potassium carbonate, and sodium chloride. These batch constituents should comprise only trace amounts of transition metal and other impurities. Of course, other batch materials of equivalent purity yielding the desired oxides in the specified proportions may alternatively be used.

Table I below reports an example of a preferred glass composition provided in accordance with the invention, including a suitable batch for the glass, an oxide composition for the glass as calculated from the batch, and an analysis of the composition of the glass. Batch weights are reported in parts, by weight, and glass compositions in weight percent. The glass shown was melted in a silica crucible at approximately 1500° C.

TABLE I

| BATCH | | GLASS COMPOSITION | |
|---|---|---|---|
| Material | Weight | Oxide | Batched | Analyzed |
| KPCL Sand | 590 | $SiO_2$ | 58.9 | 59.8 |
| Boric Oxide | 175 | $B_2O_3$ | 17.2 | 16.6 |
| Aluminum Hydroxide | 212 | $Al_2O_3$ | 13.8 | 13.5 |
| Lithium Carbonate | 51 | $Li_2O$ | 2.0 | 2.03 |
| Sodium Carbonate | 93 | $Na_2O$ | 6.0 | 5.79 |
| Potassium Carbonate | 21 | $K_2O$ | 1.5 | 1.37 |
| Sodium Chloride | 9 | Cl | 0.6 | 0.33 |
| Cornstarch | 3 | | | |

As indicated in Table I, there is some volatilization, principally of Cl, from the batch during melting. This can be controlled to some degree by compensation in the batch formulation and/or through selection of melting conditions and equipment, and is, in fact, desirable for removing bubbles from the glass during melting.

The properties of the glass reported in Table I are reported below in Table II. As is evident from a study of the data, the glass exhibits excellent UV transmittance at 254 nm, moderate softening and thermal expansion characteristics, and good viscosity at the liquidus temperature of the glass.

TABLE II

| Physical Property | |
|---|---|
| Softening Point (°C.) | 685° |
| Anneal Point (°C.) | 500° |
| Strain Point (°C.) | 463° |
| Thermal Expansion ($\times 10^{-7}/°C$.) | 61° |
| Liquidus Temperature (°C.) | 857° |
| Viscosity at Liquidus | $2 \times 10^5$ poises |
| % T (1 mm) | |
| 254 nm | 82% |
| 185 nm | 1% |

Figure 2:
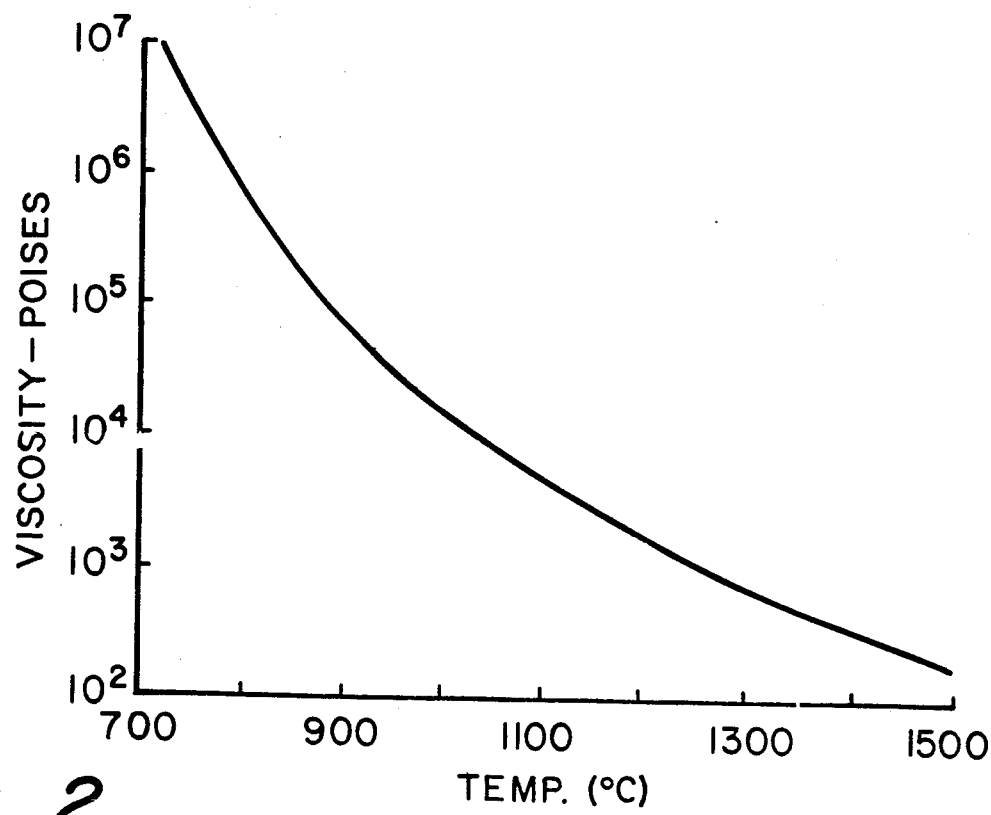
FIG. 2 is a graph plotting viscosity as a function of temperature for a glass provided in accordance with the invention.

FIG. 1 of the drawing sets forth a graph of transmittance for the glass reported in Tables I and II above, the graph plotting transmittance as a function of wavelength over the wavelength range 200–400 nm. A temperature viscosity profile for the glass, plotting viscosity as a function of temperature over the range 700°-1500° C., is shown in FIG. 2.

To reduce the absorbing characteristics of impurities such as iron in the glass, it is desirable to melt the glass under reducing conditions. This is most conveniently accomplished by including reducing agents in the batch in proportions sufficient to convert trace amounts of iron in the batch to the $Fe^{2+}$ state. Examples of reducing agents which can accomplish this result, as shown in Table I above, include organic compounds such as sugar or cornstarch although alternative batch reducing agents may also be used.

The selection and addition of modifiers to the glass to modify the physical properties in the desired way poses a difficult problem because, as previously noted, most modifiers employed in the manufacture of silicate glasses move the ultraviolet absorption edge of the glass toward the visible, and thus invariably increase the absorption at 254 nm. This is thought to be due to the effect of such modifiers, and particularly alkali metal oxide modifiers, in increasing the concentration of non-bridging oxygen atoms in the glass. Non-bridging oxygen atoms are considered to be stronger absorbers of ultraviolet radiation than bridging oxygen atoms bound into the silica network.

While some theoretical models would predict that the further addition of $B_2O_3$ and/or $Al_2O_3$ to the glass would reduce the non-bridging oxygen content thereof, $B_2O_3$ additions would be expected to reduce the durability of the glass. Further, $Al_2O_3$ additions have in the past been limited, both to assure optimum UV transmittance and perhaps to avoid unacceptable increases in the liquidus temperature of the glass.

The undesirable effects of simple alkali metal oxide additions to ultraviolet transmitting glasses can be demonstrated by adding alkali metal oxides to an alkali boroaluminosilicate glass such as Corning Code 9741 glass. When added in proportions effective to increase the thermal expansion coefficient of the glass to the range of $60 \times 10^{-7}/°CC$. or above, such additions unacceptably increase the ultraviolet absorption of the glass, such that it no longer exhibits the necessary transmittance at 254 nm. The glasses of the invention, however, as illustrated in Tables I and II above, exhibits both good UV transparency and moderate thermal expansion.

Further examples of selected glass compositions provided in accordance with the invention which exhibit the required ultraviolet transparency and at the same time have higher thermal expansion coefficients are reported below in Table III. Reported in Table III for each of the glasses set forth are the physical properties of the glass, including the softening, annealing, and strain point temperatures thereof, the internal liquidus temperature of the glass, the glass viscosity at the liquidus, the thermal expansion coefficient (C.T.E.) of the glass, and the ultraviolet transmittance characteristics thereof. The compositions are reported in parts by weight, but closely approximate weight percent.

The glasses shown in Table III may be conveniently melted in silica crucibles from pure batch ingredients at temperatures of 1400°-1600° C. within times of 4-16 hours. The molten glasses thus provided are then cast into glass patties, and are thereafter annealed and tested for physical and optical properties.

The ultraviolet transmittance data shown in Tables II, III and IV was determined on individual glass samples of each of the reported compositions which were approximately 1 mm thickness. Measurements were made utilizing a Cary 210 spectrophotometer in the 100% transmittance mode, with all transmittance values being thereafter corrected to 1 mm thickness. Thermal expansion coefficients are reported as average values over the temperature range 0°-300° C.

TABLE III

|  | 2 | 3 | 4 | 5 | 6 |
|---|---|---|---|---|---|
| $SiO_2$ | 59.6 | 60.9 | 59.9 | 61.4 | 59.0 |
| $B_2O_3$ | 17.4 | 17.8 | 17.5 | 17.9 | 17.3 |
| $Al_2O_3$ | 14.0 | 11.9 | 14.1 | 12.0 | 13.9 |
| $Li_2O$ | 1.1 | 2.1 | 2.1 | 2.1 | 2.1 |
| $Na_2O$ | 6.0 | 6.2 | 6.1 | 6.2 | 6.0 |
| $K_2O$ | 1.5 | 0.8 | — | — | 1.5 |
| Cl | 0.4 | 0.4 | 0.4 | 0.4 | 0.4 |
| Soft. Pt. | 736° | 678° | 702° | 682° | 687° |
| Anneal Pt. | 507° | 498° | 506° | 498° | 494° |
| Strain Pt. | 461° | 462° | 458° | 460° | 457° |
| Liquidus Temp. | — | 799° | — | 820° | 866° |
| Viscosity at the Liquidus ($\times 10^5$ poises) | — | 4.8 | — | 3.5 | 1.5 |
| C.T.E. ($\times 10^{-7}/°C.$) | 59.2 | 58.2 | 56.4 | 56.3 | 61 |
| % T (254 nm) | 81% | 81.4% | 84% | 81.9% | 82% |

Composition has been found to be critical in attaining the required combination of thermal expansion and ultraviolet transmittance characteristics in accordance with the invention. Table IV below sets forth examples of glasses melted with high purity batch constituents in the manner reported for the compositions shown in Table III above, but which fall outside the ranges of composition required for meeting the objectives of the present invention. Reported in Table IV for each of the composition examples shown are the ultraviolet transmittance and thermal expansion data as reported in Table III.

TABLE IV

|  | A | B | C | D | E | F |
|---|---|---|---|---|---|---|
| $SiO_2$ | 65 | 58.5 | 57.3 | 61.0 | 58.1 | 57.9 |
| $B_2O_3$ | 27 | 17.1 | 16.8 | 17.8 | 17.0 | 16.9 |
| $Al_2O_3$ | 5 | 13.7 | 13.5 | 11.0 | 15.2 | 13.6 |
| $Li_2O$ | 1 | 3.0 | 2.0 | 2.1 | 2.0 | 2.0 |
| $Na_2O$ | 2 | 5.9 | 5.9 | 6.2 | 5.9 | 7.8 |
| $K_2O$ | — | 1.5 | 4.3 | 1.5 | 1.5 | 1.5 |
| Cl | — | 0.4 | 0.4 | 0.4 | 0.4 | 0.4 |
| F | 4.0 | — | — | — | — | — |
| Soft. Pt. | 705 | 658 | 664 | 666 | 697 | 664 |
| Anneal Pt. | — | 495 | 493 | 500 | 500 | 499 |
| Strain Pt. | — | 460 | 457 | 465 | 461 | 462 |
| Expansion ($\times 10^{-7}/°C.$) | 39.5 | 63.7 | 67.0 | 60.0 | 61.1 | 66.8 |
| % T (254 nm) | 80 | 72 | 66 | 72 | 76 | 71 |

Composition A in Table IV approximates the composition of Corning Code 9741 glass, and exhibits adequate UV transmittance at 254 nm. However the expansion coefficient of the glass is much lower than desired. Compositions B-F exhibit the required higher thermal expansion, but do not have the necessary UV transparency. Compositions B, C and F contain $Li_2O$, $Na_2O$ and/or $K_2O$ outside the range specified for the present glasses, while compositions D and E are outside the specified range of $Al_2O_3$ content.

In some cases, glasses provided in accordance with the invention may show some coloration in the visible regions of the spectrum, generally of violet-blue or yellow-red to red hue. This coloration may be due to reduced polysulfide radicals in the glass at very low concentrations, and is a result of the highly reduced character of these glasses. This color is not harmful to the ultraviolet transmittance characteristics of the glass, however, and has not been considered of sufficient importance to warrant the use of higher cost batch materials or other measures to totally eliminate the effect.

I claim:

1. An ultraviolet transmitting glass article consisting essentially, in weight percent, of about 58–62% $SiO_2$, 15–18% $B_2O_3$, 11.5–14.5% $Al_2O_3$, 1–2.5% $Li_2O$, 5.5–6.5% $Na_2O$, 0–2.0% $K_2O$, and 0–0.6% Cl, the article having a thermal expansion coefficient (0°–300° C.) in the range of $56-62 \times 10^{-7}/°C$. and an ultraviolet transmittance, in 1 mm cross section, of at least 80% at a wavelength of 254 nm.

* * * * *